(12) United States Patent
Bruce

(10) Patent No.: US 7,905,968 B2
(45) Date of Patent: Mar. 15, 2011

(54) METHOD OF HEAT TREATING CULTIVATING DISC, COULTER, AND SEED DRILL BLADES MADE FROM HEAT QUENCHED BORON STEELS, SUCH THAT THEY CAN BE ROLLER RE-EDGED AND RE-SHARPENED, AND YET RETAIN EXCELLENT TOUGHNESS, HARDNESS AND WEAR CHARACTERISTICS, AND ARE ESPECIALLY USEFUL IN DRY SANDY SOILS SUCH AS FOUND IN CERTAIN WHEAT GROWING REGIONS

(76) Inventor: Douglas G Bruce, Perry, IA (US)

( * ) Notice: Subject to any disclaimer, the term of this patent is extended or adjusted under 35 U.S.C. 154(b) by 454 days.

(21) Appl. No.: 12/112,143

(22) Filed: Apr. 30, 2008

(65) Prior Publication Data

US 2009/0272470 A1 Nov. 5, 2009

(51) Int. Cl.
*C21D 9/18* (2006.01)
(52) U.S. Cl. ......................................... 148/654; 148/663
(58) Field of Classification Search .................. 420/121, 420/106; 148/320, 330, 333–336, 648–654, 148/660–664, 588
See application file for complete search history.

(56) References Cited

U.S. PATENT DOCUMENTS

| | | | |
|---|---|---|---|
| 4,362,553 A | 12/1982 | Ray | |
| 4,440,568 A | 4/1984 | Staggers | |
| 5,139,581 A * | 8/1992 | Grimm et al. | 148/632 |
| 5,899,052 A | 5/1999 | Turner | |
| 5,906,053 A * | 5/1999 | Turner et al. | 30/347 |
| 5,916,114 A | 6/1999 | Turner | |
| 6,294,031 B1 * | 9/2001 | Takeno et al. | 148/654 |
| 7,143,838 B2 | 12/2006 | Piccat | |
| 2004/0047757 A1 * | 3/2004 | Takayama | 420/107 |

FOREIGN PATENT DOCUMENTS

| | | | |
|---|---|---|---|
| GB | 2155294 | * | 9/1985 |
| JP | 05-078781 | * | 3/1993 |

OTHER PUBLICATIONS

English abstract of Indian patent 193032, Bhakat A.K. et al., Jun. 26, 2004.*

* cited by examiner

*Primary Examiner* — Deborah Yee
(74) *Attorney, Agent, or Firm* — Sturm & Fix LLP

(57) ABSTRACT

Method of heat treating cultivating disc, coulter or grain drill blades made from heat quenched boron steels, such that they can be re-edged and re-sharpened using rollers, and yet retain excellent toughness, hardness and wear characteristics. The invention also includes the cultivating disc, coulter or grain drill blades made from boron steel, which have been heat treated according to the inventive method, such that can be re-edged or sharpened using pinch rollers. The cultivating blades are especially useful in the dry, sandy soils such as found in the wheat growing regions extending from central Kansas down into Texas.

20 Claims, No Drawings

METHOD OF HEAT TREATING CULTIVATING DISC, COULTER, AND SEED DRILL BLADES MADE FROM HEAT QUENCHED BORON STEELS, SUCH THAT THEY CAN BE ROLLER RE-EDGED AND RE-SHARPENED, AND YET RETAIN EXCELLENT TOUGHNESS, HARDNESS AND WEAR CHARACTERISTICS, AND ARE ESPECIALLY USEFUL IN DRY SANDY SOILS SUCH AS FOUND IN CERTAIN WHEAT GROWING REGIONS

CROSS REFERENCE TO RELATED APPLICATIONS

Not Applicable.

FIELD OF THE INVENTION

This invention relates to a method for heat treating cultivating disc, coulter and seed drill blades formed from heat quenched boron steels, having a Rockwell C hardness between about 47 and 60 to reduce the Rockwell C hardness to between about 40 to 46, preferably between about 41 and 45, more preferably between about 42 and 44, such that they can be re-edged and re-sharpened using rollers, yet retain excellent toughness, hardness and wear characteristics.

Typically, the blades are stamped out from the heat quenched boron steels and the edges formed thereon. The invention also includes the cultivating blades made from heat quenched boron steel, and which have been heat treated according to the present inventive method. The cultivating blades treated according to the present invention are especially useful in dry sandy soils, such as found in the wheat growing regions extending from central Kansas down into Texas. The dry sandy soils wear and dull the outer edges of the cultivating blades. Whereas in damper less sandy soils, cultivating blades wear more uniformly across the entire surface area (sides) of the blades; and, they tend to be "self-sharpening". The cultivating blades used in the dry sandy soils, such as found in these wheat growing regions, wear at the outer edges, and thus require frequent re-edging and re-sharpening. Heat treatment of the disc, coulter and seed drill blades according to the present invention reduces the Rockwell C hardness to between about 40 and 46, preferably between 42 and 44, whereby the edges of the cultivating blades can be roller re-edged and re-sharpened, without removal or loss of metal, chipping or breakage. Sharpening using grinding techniques undesirably removes metal, and tends to reduce the hardness of the ground surface, thus promoting premature wear and failure. The inventive cultivating blades having the unexpected and beneficial properties, in addition to being amenable to re-edging and re-sharpening using rollers, of not chipping easily, and of withstanding impact to a substantially high degree.

BACKGROUND AND DESCRIPTION OF RELATED ART

The dry sandy soils found in wheat growing regions, such as those extending from central Kansas down into Texas, wear and dull the outer edges of cultivating disc, coulter and seed drill blades used in these regions. With the major wear occurring at the outer edges of the cultivating blades used in these dry sandy soils, they require frequent re-edging and re-sharpening. Re-edging and re-sharpening by techniques such as grinding undesirably removes metal, and reduces hardness due to heating during grinding; thereby drastically shortening the useful life of the blades. There are sharpening machines in the market place that roll and pinch the edges of cultivating blades to a re-edged and re-sharpened condition. Traditional heat quenched boron steels and water quenched steels cannot be rolled due to the quenched condition of these steels, which gives them high Rockwell C hardness greater than about 47 RWC. Typically, boron steels are heated to about 1500° F. at the start of the heat quench curve. Quenching is done using water, water plus oil, and glycol based quench liquids. The inventive heat treatment involves light tempering for about one hour. For the inventive heat treatment, the cultivating blades formed from the heat quenched boron steels should not be stacked or touching each other so that circulation is completely around each blade, so that the full extend of the heating to reduce the stress caused by quenching in the edge can be evenly distributed. Boron steels useful in the invention should have a minimum of from about 0.018% to a maximum of about 0.039% carbon; and, from about 0.60% to a maximum of about 1.51% manganese. Boron gives the steel enhanced harden ability as compared with non-boron steels.

The inventor has discovered that to make cultivating blades formed from quenched boron steel into "rollable" products, they must be heat treated in a certain inventive manner. The inventive heat treatment reduces the molecular stress in the blades and reduces the Rockwell C hardness to within a range wherein the blades may be re-edged and re-sharpened using known rolling machines. The inventive heat treatment includes heating the cultivating blades for a time and temperature which reduces the Rockwell C hardness to between 40 and 46 RWC, preferably between about 41 and 45 RWC, and more preferably between about 42 to 44 RWC; whereby the inventive blades can be roller re-edged and re-sharpened, yet retain excellent toughness, hardness and wear characteristics. The inventor has discovered that if the Rockwell C hardness is reduced below 40, the wear ability of the cultivating discs is significantly reduced. The desired Rockwell C hardness of the heat quenched boron steel used in the present invention is between about 47 to 60, preferably 47 to 55, and more preferably between 47 and 50. If the Rockwell C hardness runs higher, then increased treatment temperatures are required; the extra heat will lessen the wear characteristics of the product blades.

Wear in cultivating blades used in wetter and less sandy soils, differs from the wear in blades used in the dry, sandy soils. In wetter and less sandy soils, the wear tends to be more evenly spread over the entire surface of the blades, and the blades tend to be "self-sharpening". Note U.S. Pat. No. 7,143, 838, anti-penultimate paragraph on page 7. The inventive cultivating blades can be repeatedly re-edged and re-sharpened using rollers. Additionally, the inventive cultivating blades treated according to the present inventive method exhibit the unexpected and beneficial properties of having edges that withstand impact to a high degree, and do not chip easily.

The safety and durability of rotary cultivating blades is of primary concern in the production thereof. Experience with blade failures has driven manufacturers to provide blades with low hardness to prevent impact failures. However, this has led to failures due to bending and excessive wear. Blades with high Rockwell C hardness, such as between 47 and 60, are subject to unacceptable impact failure, and cannot be roller sharpened without damage to the sharpening rollers. High carbon steels exhibit higher levels of hardness, but are difficult to work, have reduced toughness, and result in accelerated tool wear, adding to manufacturing costs. Mitigating the benefits of high hardness is the tendency to suffer unacceptable catastrophic impact failure. Heat quenched boron steels, such as heat quenched grade 10B38, exhibit desirable high levels of toughness and have been used for lawn mower blades, as well as various cultivating blades. However, the high hardness of the heat quenched boron steels makes roller sharpening impractical. Blades made from untreated boron steels are susceptible to wear at a greater than optimum rate, and have less than optimal resistance to edge deformation, bending and fatigue. The hardness of boron steels is usually elevated by marquenching or other quench treatments to a Rockwell C hardness somewhere between 47 and 60. Typically, quenching is done using water, or water plus oil, or glycol base quench liquid. See, for example, U.S. Pat. No. 5,916,114, and U.S. Pat. No. 5,899,052. In the '114 patent, the boron steel is heat quenched to a Rockwell C hardness between 48 and 55. The addition of more soluble oil or glycol to the quench water slightly reduces the quench hardness, and somewhat reduces cracking.

Rockwell C hardness (RWC) is used to measure the hardness of hard steels, such as boron steels. In the Rockwell test, a hardened-steel ball or a diamond cone is used. Various indenters and loads are employed for different materials. A minor load, which does not deform the metal, is used to seat the indenter, and a major load is applied for indentation. The depth of the penetration effected by the major load is a measure of Rockwell hardness. The Rockwell C scale is used for hard steels, such as boron steels. For the Rockwell C scale, a diamond cone is used with a load of 150 kilograms. Rockwell tests are easily and rapidly made and are widely used in industry. See "Metallurgy For Engineers", Wulff, Taylor and Shaler, New York, John Wiley & Sons, Inc. 1952 (Fifth Printing: June, 1960), pp. 210-212, which is incorporated herein by reference in its entirety.

Boron steels are available in a wide range of formulations which typically include carbon, phosphorus, silicon, copper, chromium, titanium, manganese, sulfur, aluminum, nickel, columbium or other rare earths, molybdenum, tin, calcium, zirconium, and boron, and the balance iron (note U.S. Pat. No. 4,362,553, third paragraph in "SUMMARY OF THE INVENTION"; also, U.S. Pat. No. 4,440,568, which is incorporated herein by reference in its entirety). The boron is present to increase the harden ability of the steel. To develop the maximum harden ability effect, boron must be present in the steel in a minimum amount of about 0.0005% boron. Greater than 0.003% boron has little or no beneficial effect and is wasted. Since boron has a strong affinity for oxygen and nitrogen, these elements must either be removed or controlled for boron to have its full hardening effect. It has been a practice to add boron to steel with titanium and zirconium present to protect the boron from nitrogen, and with aluminum present to protect the boron from oxygen. Alloying additives are commonly used containing mixtures of small amounts of boron, and more substantial amount of titanium, and rare earths to protect the boron from nitrogen and oxygen. The titanium is also present in the boron containing additive to promote correct mixing with the molten steel. The amount of titanium is determined by each steel mill, as every alloying process differs slightly. The product boron steel will normally contain on the order of 0.0005% to about 0.003% residual boron, and on the order of about 0.035% to about 0.055% residual titanium with good harden ability effect. The removal or addition of zirconium or aluminum must to done with great care. As noted above, typically the boron steels are quenched, using water, water plus oil, or glycol base quench liquids, to a Rockwell C hardness of between a minimum of about 47 and a maximum of about 60. Where the boron steels are water quenched, temperatures of about 1500° F. are required when the quench curve is started.

The heat quenched boron steels useful in this invention range from about grade 10B21 through about grade 15B35. They can have a heat quenched hardness ranging from a about 46 RWC as a minimum to about 60 RWC as a maximum. In a preferred embodiment of the present invention, grade 15B25 boron steel is used having a heat quenched Rockwell C hardness of about 47 to 50. A most preferred and best boron steel for use in the present invention is grade 15B26. Osmundson Specification boron steel 15B26 contains about 0.24 to 0.28% carbon and about 1.0 to 1.3% manganese. It also contains 0.015 maximum % phosphorous; 0.15 to 0.03% silicon; 0.15% copper; 0.10 to 0.20% chromium; 0.0005 to 0.003% boron; 0.03 to 0.06% titanium; 0.012% nitrogen; 1.10 to 1.25% manganese; 0.010 maximum % sulfur; 0.015 to 0.035% aluminum; 0.12 maximum % nickel; 0.008 max % columbium; 0.015% tin; and 0.001 to 0.005% calcium. (Osmundson Tillage Tools, Osmundson Mfg. Co., Box 158, Perry, Iowa 50220, "www.osmundson.com"). Examples of boron steels useful in the present invention, on either side of grade 15B26 boron steel, are grades 15B23, 15B27 and 15B31. The compositions of various other examples of boron steels useful in the present invention are described in a listing by Sumitomo Metals (Kokura), Ltd. Note their website (http://www.kokura.sumitomometals.co.jp/e/product/sumitomo/010 . . . ), which web pages are copied and identified in the IDS of this application, and which web pages are incorporated herein by reference in their entirety. Grade 10B21, for example, is described as a low carbon boron steel containing about 0.18 to 0.23% carbon; 0.15 to 0.30% silicon; 0.80 to 1.10% manganese; less than or equal to 0.040% phosphorous; less than or equal to 0.050% sulfur; and, at least 0.0005% boron. Grade 10B22 is described as a low carbon boron steel containing about 0.18 to 0.23% carbon; 0.70 to 1.00% manganese; less than or equal to 0.040% phosphorous; less than or equal to 0.050% sulfur; and, at least 0.0005% boron. Grade 15B25 is described as a low carbon boron steel containing about 0.22 to 0.30% carbon; less than or equal to 0.10% silicon; 0.75 to 1.25% manganese; less than or equal to 0.035% phosphorous; less than or equal to 0.040% sulfur; and, at least 0.0005% boron. Grade 15B25 boron steel can be heat treated at a low temperature of about 450° F. to reduce embrittlement. However, the Rockwell C hardness of the 15B25, would not be reduced from the original RWC of 47 to 50; and, use of this low a temperature would not be recommended, due to adverse affect of that high level of hardness on any roller equipment used in attempting roller re-edging or sharpening. Grade 15B26 is described as a low carbon boron steel. Grade 10B35 is described as a carbon boron steel containing about 0.32 to 0.38% carbon; 0.15% to 0.35% silicon; 0.60 to 0.90% manganese; less than or equal to 0.030% phosphorous; less than or equal to 0.035% sulfur; less than or equal to 0.35% chromium, and, at least 0.0005% boron. Grade 10B37 is described as a carbon boron steel containing about 0.33 to 0.39% carbon; 0.15% to 0.35% silicon; 0.70 to 1.00% manganese; less than or equal to 0.030% phosphorous; less than or equal to 0.035% sulfur; less than or equal to 0.35% chromium, and, at least 0.0005% boron. Grade 15B35 is described as a carbon boron steel containing about 0.34 to 0.39% carbon; 0.15% to 0.35% silicon; 0.95 to 1.10% manganese; less than or equal to 0.030% phosphorous; less than or equal to 0.035% sulfur; less than or equal to 0.35% chromium, and, at least 0.0005% boron. Grade 10B36 is described as a carbon boron steel containing about 0.32 to 0.37% carbon; 0.15% to 0.35% silicon; 1.20 to 1.50% manganese; less than or equal to 0.030% phosphorous; less than or equal to 0.035% sulfur; and, at least 0.0005% boron.

U.S. Pat. No. 5,899,052 illustrates making rotary blades from boron steels, such as boron steel 10B38, which blades are heat treated to yield a Rockwell C hardness of 48 or above. These elevated hardness would preclude roller sharpening. Boron steel 10B38 contains iron with about 0.035-0.42% carbon, 0.60-0.90% manganese, and standard limits of sulfur and phosphorus. The "B" means that is has been boron treated to improve harden ability, and can be expected to contain 0.0005-0.003% boron. Not hardness, but harden ability, which is an important difference. See "http://www.finishing.com/93/98.shtml", letter 9388. U.S. Pat. No. 5,916,114 similarly forms rotary blades from boron steel, such as grade 10B38 alloy, which has been quenched to a Rockwell C hardness between 48 and 55. Boron steels having a hardness above 47 RWC cannot be re-edged and sharpened by rolling due to their excessive hardness and brittleness. They tend to break, crack or otherwise fail during roller sharpening; and, due to their extreme hardness damage rollers used in roller sharpening. Typically, disc, coulter and seed drill blades used in normal less sandy, wetter soils tend to be self sharpening (note U.S. Pat. No. 7,138,838, for example).

The boron steels useful in the present inventive method range from grade 10B21 to 15B35, which have a quenched hardness ranging from a minimum of about 47 RWC to a maximum of 60 RWC; preferably from about 47 to 55 RWC; and, most preferably from about 47 to 50 RWC. Grade 15B26 boron steel with a heat quenched Rockwell C hardness ranging from 47 to 50 constitutes a best mode for use in this invention. The widest range of tempering temperature, especially for heat quenched grade 15B26 boron steel, is from about 710 to 730° F. This will give a Rockwell C hardness of about 41 to 45. The preferred heating temperatures and times for heat treating and relieving the stresses in cultivating blades formed from heat quenched 15B26 grade steel are from about 715 to 725° F. for about 45 to 55 minutes. This will reduce the RWC to about 42 to 44. The 15B26 boron steel will normally have a carbon content ranging from about 0.24 to 0.28; and, a manganese content ranging from about 1.00 to 1.50%. Within the range of 10B21 to 15B35, and on either side of 15B26, are, as examples, grades 15B23, 15B27 and 15B31 boron steels. The quench heat treatment of 15B26 requires the steel be heated to about 1500° F., when it starts the quench using straight water. This would be a best mode to insure achieving the narrower most preferred hardness range for the inventively heat treated blades of 42 to 44; and, would result in heat treated product blades exhibiting optimal wear and optimum roll-ability. The sufficient time and temperature ranges for all the boron steel grades covered by the present invention is much greater. For 10B21 a temperature of 350° F. for 30 minutes would be adequate. At the other end of the range of useful boron steels, 15B35, for example, requires about one hour at a temperature of 825° F. These temperatures can vary slightly depending on the amount of carbon in the boron steel. For instance, 15B35 at its maximum can have about 0.38 to 0.39% carbon, requires a heat treatment temperature of about 850° F. At its minimum of about 0.32 to 0.33% carbon, 15B35 requires a heat treatment of about 785° F. The heat treatment of the formed blades in the present inventive method constitutes a light tempering, typically for about one hour, in a continuous furnace, with circulation completely around each formed blade. During the inventive heat treatment, the blades should not be stacked or touching each other, so that the full extend of the heating to reduce the stress caused by quenching can be evenly distributed. In the present invention the useful boron steel, which range from grade 10B21 to grade 15B35, can have an as quenched Rockwell C hardness ranging between a minimum of about 47 RWC to a maximum of about 60 RWC. The perfect hardness for grade 15B25 is from about 47 to about 50 RWC. The inventive heat treating method results in the inventive cultivating blades having edges that can be roller re-edged and re-sharpened, do not chip easily, and can withstand impact to a substantially high degree.

The prior art disc, coulter and seed drill blades are typically made from boron steels which have been quenched to such a high hardness that roller sharpening is not feasible. Also, the high quenched hardness, e.g., above 47 RWC, can lead to impact failures due to brittleness, during use such as in rocky soil. Attempts to avoid brittleness by reducing the hardness have resulted in products which quickly wear out. Boron steels, however, combine characteristics of hardness, wear resistance and strength, along with corrosion and oxidation resistance that are highly desirable. There has long been a need in the prior art for cultivating disc, coulter and seed drill blades made of boron steels, which can be roller re-edged and re-sharpened without damage to the rollers, which do not chip during roller hardening, which can withstand impact to a high degree, and which retain excellent hardness, strength, toughness, and wear resistance. The present inventors have discovered a method for heat treating blades made from heat quenched boron steels, which results in inventive cultivating blades which exhibit these characteristics.

SUMMARY OF THE INVENTION

An object of the present invention is the production of cultivating disc, coulter and seed drill blades made from heat quenched boron steels, which can be roller re-edged and re-sharpened without damage to the rollers, does not chip during the roller processing, withstand impact to a high degree, and retain excellent hardness, strength, toughness, and wear resistance. The present invention is drawn to a method of heat treating cultivating blades formed from heat quenched boron steels, which results in cultivating blades that exhibit these desirable characteristics. The edges of the disc, coulter and seed drill blades of the present invention can be repeatedly re-edged and re-sharpened, using hardened rollers which pinch the edges of the inventive blades to a re-edged and re-sharpened condition. Traditional quench hardened boron steel and similar hardened steels cannot be roller re-edged and/or re-sharpened due to their excess hardness of above about 47 Rockwell C hardness (RWC). Rollers used to try to re-edge and re-sharpen blades having Rockwell C hardness in excess of about 46 RWC are subject to being severely damaged during rolling.

The present inventor has unexpectedly discovered that heat treating cultivating blades, made from heat quenched boron steels having a Rockwell C hardness of between about 46 and 60 RWC, preferably between 47 and 55 RWC, and more preferably between 47 and 50, to a Rockwell C hardness between about 40 to about 45 RWC, preferably between 42 to 44 RWC, makes them amenable to roller re-shaping and re-sharpening, while maintaining excellent hardness, strength, toughness and wear resistance. Thus, an object of the present invention is a method of heat treating the disc, coulter and seed drill blades, formed from heat quenched boron steels having a Rockwell C hardness between about 46 to about 60 RWC, preferably between 47 and 55 RWC, and more preferably between 47 and 50, to reduce Rockwell C hardness of the blades to between about 40 to about 45 RWC, preferably between 42 and 44 RWC. The inventive method includes heating the disc, coulter and seed drill blades to a temperature and for a time sufficient to reduce the Rockwell C hardness to between about 40 and about 45 RWC, preferably between 42 and 44 RWC. For example heat treating the formed discs, coulters and seed drills to about 650° F. for about one hour reduces the Rockwell C hardness to with the desired reduced range.

A further object of the present invention is the cultivating disc, coulter and seed drill blades treated according to the inventive method; which blades can be roller re-edged and re-sharpened, and yet retain excellent hardness, strength, toughness and wear resistance. The inventive cultivating discs exhibit a reduced Rockwell C hardness of between about 40 and 46, preferably between 42 and 44. The inventive cultivating blades are made from heat quenched boron steels have a Rockwell C hardness of between 46 and 60, preferably between 47 and 55, and most preferably between 47 and 50, and are heat treated according to the present invention at a temperature and for a time sufficient to reduce the hardness thereof to between 40 and 46, preferably between 42 and 44. The inventive cultivating blades, which can be roller re-edged and re-sharpened, and yet retain excellent hardness, strength, toughness and wear resistance, constitute a further object of the present invention. It is a further object of the present invention to provide cultivating disc, coulter and seed drill blades, which can be repeatedly roller re-edged and re-sharpened, and are especially useful in the dry sandy soils found in the wheat growing regions extending from central Kansas down into Texas. The disc, coulter and seed drill blades used in these dry sandy soil dull rapidly at the outer edges thereof, and require frequent re-edging and re-sharpening. Re-edging and re-sharpening by grinding is undesirable since it removes metal and causes loss of hardness due to heating during grinding, thereby drastically shortening the useful life of cultivating blades. The inventive heat treatment of the cultivating blades reduces the Rockwell C hardness to between about 42 to 44, permits roller re-edging and re-sharpening thereof without damage to the rollers, while retaining therein good hardness, strength, toughness and overall wear resistance. The inventive cultivating blades made from heat quenched boron steels, heat treated according to the present inventive method to reduce the Rockwell C Hardness to between 42-44 RWC, are roller sharpenable, retain good hardness, strength and toughness, and wear resistance. The inventive blades are unexpectedly fit and useful in sandy, dry soils such as found in the wheat growing regions extending from central Kansas into Texas.

In summary, the inventor has discovered a heat treating method which results in a reduction of the Rockwell hardness of cultivating blades between about 42 and 44, whereby they can be roller re-edged and re-sharpened, and yet retain the beneficial qualities of the boron steels. The inventive discs, coulters and seed drills of the present invention, and the inventive method for making same, fulfills a long felt need in the prior art, especially for cultivating blades useful in dry sandy soils. That is, discs, coulters and seed drills that can be roller re-edged and re-sharpened, and yet retain excellent hardness, strength and toughness, and wear resistance.

DETAILED DESCRIPTION OF THE INVENTION

The present invention is directed to making cultivating disc, coulter and seed drill blades from boron steels, which can be re-edged and re-sharpened using rollers, and yet retain excellent toughness, hardness and wear characteristics. The inventive cultivating blades are especially useful in sandy, dry soils, such as found in the wheat growing regions extending from central Kansas into Texas. These dry sandy soils wear the edges of the cultivating blades necessitating frequent re-edging and re-sharpening. Cultivating blades used in wetter less sandy soils wear more evenly across the entire surface, including the sides of the blades; and, thus tend to be "self-sharpening". The present invention includes a method for heat treating cultivating blades made from quenched boron steels, such that they can be roller re-edged and re-sharpened, and yet retain excellent hardness, strength and toughness, and wear resistance.

The inventor has discovered that by heat treating cultivating discs, coulters and seed drill blades in a specific manner to reduce the Rockwell C hardness thereof to within a specified range, makes it possible to re-edge and re-sharpen the blades using rollers, while retaining in the blades excellent toughness, hardness and wear resistance characteristics. The Rockwell C hardness of prior art cultivating blades made from heat quenched boron steels or high carbon steels are to high, for example over 47 RWC, to permit roller re-edging and re-sharpening. Where the hardness of the cultivating discs is less than about 40 RWC, or reduced to below about 40 RWC, the wear ability of the blades is significantly reduced; and, they are susceptible to bending and other deformation. The elevated hardness of some prior art blades damages any rollers used to try roller re-edging and re-sharpening. The inventive heat treatment reduces the Rockwell C hardness to within a specific range wherein the blades may be repeatedly re-edged and re-sharpened using rollers. In the present invention, cultivating blades, made from heat quenched boron steels having a Rockwell C hardness ranging from about 47 to 60, are heat treated at a temperature and for a time to reduce the stress caused by quenching and to reduce the Rockwell C hardness to between about 40 and about 46. Preferably, the boron steel cultivating blades used in the present invention are made from heat quenched boron steels having a heat quenched Rockwell C hardness of from about 47 to about 55; and, more preferably from about 47 to about 52. In the present invention, the cultivating discs, formed from the heat quenched boron steel, are heat treated to a temperature with a range and for a time within a range wherein the Rockwell C hardness of the edges of the cultivating blades are reduced to within the range of about 40 to about 46; preferably, within the range of about 41 to about 45; and, more preferably, within the range of about 42 to about 44. In a best mode, the Rockwell C hardness is reduced by the inventive heat treatment to a maximum of about 44. The inventive heat treated cultivating blades can be repeatedly re-edged and re-sharpened using roller re-edging and re-sharpening machines currently on the market. These roller re-edging and re-sharpening machines use hardened rolls to pinch the edges of the cultivating blades to a re-edged and re-sharpened condition.

Traditional cultivating blades made from heat quenched boron steels and similar hardened steels, such as water quenched steels, cannot be re-edged and re-sharpened using rollers due to their high quenched Rockwell C hardness of about 47 and higher. At these higher hardnesses, the prior art cultivating blades are brittle and subject to fracture during use and during any attempted at roller sharpening. Due to their excessive hardness, these hardened cultivating blades cause damage to any rollers used in attempting to roller re-edge and re-sharpen them. Typically, boron steels are quenched in water, or water plus oil, or glycol base quench liquids. Boron gives steel an added harden ability over non-boron steel. The boron steel used in the present invention should have a minimum of about 0.18% carbon to a maximum of about 0.39% carbon. Manganese needs to be present in a minimum of about 0.60% to a maximum of about 1.51%. The Rockwell C hardness of boron steel alloys is a sliding scale dependent to on the amount of carbon and manganese present. The heat quenched boron steels used in making the inventive cultivating blades, which are then heat treated according to the present invention, should exhibit a Rockwell C hardness of between about 47 and 60, preferably about 47 to 55, more preferably about 47 to 52, and most preferably about 47 to 50. As stated previously, a maximum Rockwell C hardness of about 44 represents a best mode of the inventive heat treated cultivating disc, coulter and seed drill blades. A Rockwell C hardness of about 44 gives the best rolling hardness point with most wear ability remaining.

The boron steel alloys useful in the present invention contain a minimum of 0.0005% boron. The boron is present to enhance (increase) the harden ability of the steel. To develop the maximum harden ability effect, boron must be present in the steel in a minimum amount of about 0.0005% boron. Any amount of boron over 0.003 is unnecessary and wasted. The boron steel alloys also contain from a minimum of about 0.18% carbon to a maximum of about 0.39% carbon; and, from a minimum of about 0.60% manganese to a maximum of about 1.51% manganese. The boron steel alloys also contain titanium in an amount to act as a catalyst. Since boron has a strong affinity for oxygen and nitrogen, these elements must either be removed or controlled for boron to have its full hardening effect. It has been a practice to add boron to steel with titanium and zirconium present to protect the boron from nitrogen, and with aluminum present to protect the boron from oxygen. Alloying additives are commonly used containing mixtures of small amounts of boron, and more substantial amounts of titanium and rare earths to protect the boron from nitrogen and oxygen. The titanium is also present in the boron containing additive to promote correct mixing with the molten steel. The amount of titanium is determined by each steel mill, as every alloying process differs slightly. For example, heat quenched 15B26 grade boron steel, which constitutes a best mode for practicing the present invention, contains between about 0.03 and 0.06% titanium. The product boron steel will normally contain on the order of 0.0005% to about 0.003% residual boron, and on the order of about 0.035% to about 0.055% residual titanium with good harden ability effect. The removal or addition of zirconium or aluminum must to done with great care. As noted above, typically the boron steels are quenched, using water, water plus oil, or glycol base quench liquids, to a Rockwell C hardness of between a minimum of about 47 and a maximum of about 60. Where the boron steels are water quenched, temperatures of about 1500° F. are required when the quench curve is started. Where the Rockwell C hardness of the heat quenched boron steel is above 55, the extra heat required to reduce the RWC, to the desired inventive range of 42-44, lessens the wear characteristics of the product disc, coulter and seed drill blades. Heating at lower temperatures, such as 450° F., results in blades that are too hard and damage the sharpening rollers.

The various grades of boron steel useful in the present invention differ slightly in the amounts of various elements present; and, also slightly depending on the source thereof. An "Information on Products" sheet from Sumitomo Metals (Kokura), Ltd. lists 15B26 grade boron steel as containing about 0.20 to 0.30% carbon; less than or equal to 0.035% phosphorous; less than or equal to 0.10% silicon; greater than or equal to 0.0005 boron; 1.00 to 1.50% manganese; and, less than or equal to 0.040% sulfur. Heat quenched boron steel grade 15B26, which constitutes a best mode for use the present invention, contains about 0.24 to 0.28% carbon; 0.015 maximum % phosphorous; 0.15 to 0.30% silicon; 0.15% copper; 0.10 to 0.20% chromium; 0.0005 to 0.003% boron; 0.03 to 0.06% titanium; 0.012% nitrogen; 1.10 to 1.25% manganese; 0.010 maximum % sulfur; 0.015 to 0.035% aluminum; 0.12 maximum % nickel; 0.008 maximum % columbium; 0.015% tin; and 0.001 to 0.005% calcium. Examples of boron steels useful in the present invention, on either side of grade 15B26 boron steel, include, inter alia, grades 15B23, 15B27 and 15B31. The compositions of various other examples of boron steels useful in the present invention have also been described in the listing by Sumitomo Metals (Kokura), Ltd. Grade 10B21, for example, is described as a low carbon boron steel containing about 0.18 to 0.23% carbon; 0.15 to 0.30% silicon; 0.80 to 1.10% manganese; less than or equal to 0.040% phosphorous; less than or equal to 0.050% sulfur; and, at least 0.0005% boron. Grade 10B22 is described as a low carbon boron steel containing about 0.18 to 0.23% carbon; 0.70 to 1.00% manganese; less than or equal to 0.040% phosphorous; less than or equal to 0.050% sulfur; and, at least 0.0005% boron. Grade 15B25 is described as a low carbon boron steel containing about 0.22 to 0.30% carbon; less than or equal to 0.10% silicon; 0.75 to 1.25% manganese; less than or equal to 0.035% phosphorous; less than or equal to 0.040% sulfur; and, at least 0.0005% boron. Grade 15B26 is characterized as a low carbon boron steel. Grade 10B35 is described as a carbon boron steel containing about 0.32 to 0.38% carbon; 0.15% to 0.35% silicon; 0.60 to 0.90% manganese; less than or equal to 0.030% phosphorous; less than or equal to 0.035% sulfur; less than or equal to 0.35% chromium, and, at least 0.0005% boron. Grade 10B37 is described as a carbon boron steel containing about 0.33 to 0.39% carbon; 0.15% to 0.35% silicon; 0.70 to 1.00% manganese; less than or equal to 0.030% phosphorous; less than or equal to 0.035% sulfur; less than or equal to 0.35% chromium, and, at least 0.0005% boron. Grade 15B35 is described as a carbon boron steel containing about 0.34 to 0.39% carbon; 0.15% to 0.35% silicon; 0.95 to 1.10% manganese; less than or equal to 0.030% phosphorous; less than or equal to 0.035% sulfur; less than or equal to 0.35% chromium, and, at least 0.0005% boron. Grade 10B36 is described as a carbon boron steel containing about 0.32 to 0.37% carbon; 0.15% to 0.35% silicon; 1.20 to 1.50% manganese; less than or equal to 0.030% phosphorous; less than or equal to 0.035% sulfur; and, at least 0.0005% boron.

Heating temperatures as low as about 450° F. can be used with Optimal Oxide and 15B25 boron alloys to reduce the embrittlement. However, this low a treatment temperature does not reduce the Rockwell C hardness from their original RWC of from 47 to 50. Thus, such low temperature heat treatments would not be recommended due to the adverse affect of that high level of retained hardness on any roller equipment used in attempting roller re-edging or re-sharpening.

The heat quenched boron steels useful in this invention range from about grade 10B21 through about grade 15B35. They can have a heat quenched hardness ranging from a minimum of about 46 RWC or 47 RWC to a maximum of about 60 RWC. Heat quenched 15B25 grade boron steel, which is one of the preferred embodiment of the present invention, has a heat quenched Rockwell C hardness of about 47 to 50. Heat quenched 15B26 grade boron steel constitutes a most preferred boron alloy for use in the present invention. Other heat quenched boron steels useful in the present inventive method range from grade 10B21 to 15B35, which boron steels have a quenched hardness ranging from a minimum of about 47 RWC to a maximum of 60 RWC; more preferably from about 47 to 55 RWC; even more preferably from about 47 to about 52; and, most preferably from about 47 to 52 about RWC. Grade 15B26 boron steel with a heat quenched Rockwell C hardness ranging from 47 to 50 constitutes a best mode for use in this invention. The widest range of tempering temperature, especially for heat quenched grade 15B26 boron steel, is from about 710 to 730° F. This will give a reduced Rockwell C hardness of about 41 to 45. The preferred heating temperatures and times for heat treating and relieving the stresses in cultivating blades formed from heat quenched 15B26 grade steel are from about 715 to 725° F. for about 45 to 55 minutes. This will reduce the RWC to about 42 to 44. The preferred grade 15B26 boron steel will normally have a carbon content ranging from about 0.24 to 0.28; and, a manganese content ranging from about 1.10 to 1.25%. Within the range of grades 10B21 to 15B35, and on either side of grade 15B26, are, as examples, grades 10B22, 10B25, 15B23, 15B27 and 15B31 boron steels. The heat quenching of 15B26 requires the steel be heated to about 1500° F., when it starts the quench using straight water. This would be a best mode to insure achieving the narrower most preferred hardness range for the inventively heat treated blades of 42 to 44; and, would result in heat treated product blades exhibiting optimal wear and optimum roller re-edging and resharpening characteristics. The sufficient time and temperature ranges for all the boron steel grades covered by the present invention are much greater. For 10B21 a temperature of 350° F. for 30 minutes would be adequate. At the other end of the range of useful boron steels, 15B35, for example, requires about one hour at a temperature of 825° F. These temperatures can vary slightly depending on the amount of carbon in the boron steel. For instance, grade 15B35 boron steel at its maximum carbon content of about 0.38 to 0.39% requires a heat treatment temperature of about 850° F. At its minimum carbon content of about 0.32 to 0.33%, grade 15B35 boron steel requires a heat treatment of about 785° F. The heat treatment of the formed blades in the present inventive method constitutes a light tempering, typically for about one hour, in a continuous furnace, with circulation completely around each formed blade. During the inventive heat treatment, the blades should not be stacked or touching each other, so that the full extend of the heating to reduce the stress caused by quenching can be evenly distributed. In the present invention the useful boron steels, which range from grade 10B21 to grade 15B35, can have an as quenched Rockwell C hardness ranging between a minimum of about 47 RWC to a maximum of about 60 RWC. The perfect hardness for grade 15B25 is from about 47 to about 50 RWC. The inventive heat treating method results in the inventive cultivating blades having edges that can be roller re-edged and re-sharpened, does not chip easily, and can withstand impact to a substantially high degree.

The disc, coulter and seed drill blades formed from heat quenched boron steels, can have any of the known shapes for cultivating discs; that is, flat, cupped or dished, fluted, wavy, bubble, notched, etc. The edges of the blades can be plain, non-sharpened, flat, cupped, dished or notched. The edges of these type blades, after heat treatment according to the present invention, can be repeatedly re-edged and re-sharpened using rollers.

To make the discs, coulters and seed drills into a rollable product, they must be heated to a temperature and for a time to reduce the Rockwell C hardness, from the as heat quenched hardness of 45 to 55, to a Rockwell C hardness between about 42 to 44. As an best mode example of the inventive method, the discs, coulters and seed drills are heated to 650° F. for an hour. This reduces their Rockwell C hardness to between 42 to 44. Without being tied to an exact terminology, or characterization, the heat treatment could be said to relax or temper the stresses due to heat quenching, or to reduce the molecular stress, in the discs, coulters and seed drills. The inventor has unexpectedly discovered that the heat treatment according to the present invention produces discs, coulters and seed drills which can be roller re-edged and sharpened, and yet retain excellent hardness, strength and toughness, and wear resistance. If the Rockwell C hardness is lowered below 40 RWC, the wear ability of the product is significantly reduced. Most desirably the Rockwell C hardness of the heat quenched boron steel used in making the discs, coulters and seed drills of the present invention ranges from about 47 to 50 RWC. If the RWC runs much higher, then increased temperatures are needed to reduce the RWC. The extra heat will lessen the wear characteristics of the finished products. The RWC of the starting heat quenched boron steel can be reduced in initial hardness by adding more soluble oil or glycol to the quench water.

The invention claimed is:

1. A method of making cultivating disc, coulter or grain drill blades, which can be roller re-edged and re-sharpened, and yet retain excellent toughness, hardness and wear resistance, comprising the steps of:
   (i) forming the cultivating blades from heat quenched boron steels which have a Rockwell C quenched hardness ranging from about 47 to 60 RWC; and,
   (ii) heat treating the formed cultivating blades at a temperature and for a time sufficient to reduce the Rockwell C hardness to within the range of about 42 to 44 RWC, whereby the heat treated cultivating blades can be roller sharpened and yet retain excellent toughness, hardness and wear resistance.

2. The method of claim 1 wherein the disc, coulter or grain drill blades are formed from heat quenched boron steel having a Rockwell C hardness between about 47 and about 55, and the heat treating reduces the Rockwell C hardness to within the range of about 42 to 44 RWC.

3. The method of claim 1 wherein the disc, coulter or grain drill blades are formed from heat quenched boron steel having a Rockwell C hardness between about 47 and about 52 RWC, and the heat treating reduces the Rockwell C hardness to within the range of about 42 to 44 RWC.

4. The method of claim 1 wherein the disc, coulter or grain drill blades are formed from heat quenched boron steels ranging from grade 10B21 to grade 15B35.

5. The method of claim 1 wherein the disc, coulter or grain drill blades are formed from heat quenched boron steel grade 15B25.

6. The method of claim 1 wherein the disc, coulter or grain drill blades are formed from heat quenched boron steel grade 15B26.

7. The method of claim 1 wherein the disc, coulter or grain drill blades are formed from heat quenched boron steel containing between about 0.20 and 0.36 in wt. % carbon, between about 0.60 and 1.41 in wt. % manganese, and a minimum of about 0.0005 in wt. % boron.

8. The method of claim 1 wherein the disc, coulter or grain drill blades are formed from heat quenched boron steel containing titanium.

9. The method of claim 1 wherein the formed disc, coulter or grain drill blades are heated to temperature between about 710 to about 730° F. and for a time between about 45 to 55 minutes, whereby the Rockwell C hardness is reduced to between about 42 to 44 RWC.

10. The method of claim 1 wherein the formed disc, coulter or grain drill blades are heated to temperature between about 715 to 725° F. and for a time between about 45 to 55 minutes, whereby the Rockwell C hardness is reduced to between about 42 to 44 RWC.

11. The method of claim 9 wherein the boron steel is grade 15B26.

12. The method of claim 10 wherein the boron steel is grade 15B26.

13. The method of claim 1 wherein the boron steel is grade 15B35, and the formed blades are heated to a temperature of between about 785° F. and 850° F.

14. The method of claim 13 wherein the formed blades are heated for a time of about 1 hour.

15. A method for heat treating cultivating disc, coulter or grain drill blades, formed from heat quenched boron steel having a Rockwell C hardness ranging from about 47 to about 60 RWC comprising heat treating the formed blades to a temperature and for a time sufficient to reduce the Rockwell C hardness to within the range of about 42 to 44 RWC, whereby the heat treated cultivating blades, can be repeatedly roller re-edged and re-sharpened, and yet retain excellent toughness, hardness and wear resistance.

16. The method of claim 15 wherein the disc, coulter or grain drill blades are formed from heat quenched boron steel having a Rockwell C hardness between about 47 and 55 RWC, and are heat treated for a temperature and for a time sufficient to reduce the Rockwell C hardness to within the range of about 42 to 44 RWC.

17. The method of claim 15 wherein the disc, coulter or grain drill blades are formed from heat quenched boron steel having a Rockwell C hardness between about 47 and 50, and are heat treated for a temperature and for a time sufficient to reduce the Rockwell C hardness to within the range of about 42 to 44 RWC.

18. The method of claim 15 wherein the disc, coulter or grain drill blades are formed from heat quenched boron steel containing between about 0.20 and 0.36 in wt. % carbon, between about 0.60 and 1.41 in wt. % manganese, and a minimum of about 0.0005 in wt. % boron.

19. The method of claim 15 wherein the formed disc, coulter or grain drill blades are heated to temperatures between about 710 to about 730° F. and for a time between about 45 to 55 minutes, whereby the Rockwell C hardness is reduced to between about 42 to 44 RWC.

20. The method of claim 15 wherein the formed disc, coulter or grain drill blades are heated to temperatures between about 715 to 725° F. and a time between about 45 to 55 minutes, whereby the Rockwell C hardness is reduced to between about 42 to 44 RWC.

* * * * *